United States Patent [19]

Reiner

[11] Patent Number: 5,104,133
[45] Date of Patent: Apr. 14, 1992

[54] HAULING DEVICE FOR LEAVES AND OTHER MATERIALS

[76] Inventor: David Reiner, 25641 Hilliard Blvd., Westlake, Ohio 44145

[21] Appl. No.: 625,742

[22] Filed: Dec. 11, 1990

[51] Int. Cl.⁵ .................................................. B62B 15/00
[52] U.S. Cl. .............................................................. 280/19
[58] Field of Search .................... 280/18, 19, 20, 28.17

[56] References Cited

U.S. PATENT DOCUMENTS

| | | | |
|---|---|---|---|
| 1,064,237 | 6/1913 | McClure | 280/19 |
| 1,091,402 | 3/1914 | Stout | 280/19 |
| 2,974,971 | 3/1961 | Buck | 280/19 |
| 3,319,972 | 5/1967 | Gallaher | 280/18 |
| 3,355,187 | 11/1967 | Brindle | 280/19 |
| 3,771,808 | 11/1973 | Duerst | 280/19 |
| 4,173,351 | 11/1979 | Hetland | 280/19 |
| 4,335,891 | 6/1982 | Alley et al. | 280/19 |

Primary Examiner—Andres Kashnikow
Assistant Examiner—Michael Mar
Attorney, Agent, or Firm—Renner, Otto, Boisselle & Sklar

[57] ABSTRACT

A hauling device for leaves, litter, and other materials such as stone, earth, mulch, manure and tree stumps comprises a tarpaulin with flexible support members and a rope including a unique assembly whereby the operator may secure and haul the collected material by pulling a loop of the rope. The tarpaulin is fitted with flexible support members within hems along the rear side edge and along a portion of each side edge. The rope ends are attached to the tarpaulin at both sides and threaded through the apertures of hardware located at both front and rear corners, thus providing a loop along the front side to be grasped either by the operator or a mechanical device such as a tractor. Once material is collected on the surface of the tarpaulin, the operator pulls the loop and thereby harnesses the rear and side edges, flexes the support members, and in unison confines the collected material. As the operator continues to pull the loop, obstructions on the rope arrest the confining action to provide a towline for the operator to haul the device along the ground to another location. To unload the material, the operator releases the loop and grasps the device along the rear side and rolls out the material over the front side. After the device is free of material, the operator gives the device a shake which retracts the rope and provides the device in a flat state to position for another load of material.

5 Claims, 2 Drawing Sheets

HAULING DEVICE FOR LEAVES AND OTHER MATERIALS

BACKGROUND OF THE INVENTION

1. The Field of the Invention

The field of the present invention relates to a hauling device used in the various tasks of securing and transporting material such as lawn litter, including leaves, grass clippings, twigs, and trash, or other kinds of material which can be confined within the device and dragged along the ground by hand or by a mechanical device such as a tractor.

2. The Prior Art

Heretofore, the methods of securing and transporting lawn litter and other kinds of material have been generally crude or makeshift devices such as bags, boxes, and cans which have the disadvantages of being hard to fill, may require extreme physical strength to transport, and may rip when wet or sharp material is confined and dragged along the ground. Other kinds of hauling devices such as wagons, wheelbarrows, and trailers have the disadvantage of the loading surface being off the ground thereby requiring the operator to lift up the material to be loaded. Moreover, such devices demand a substantial financial investment and are bulky to store.

Various devices have been conceived which employ a tarpaulin, or a generally rectangular sheet of thin flexible material, with means to secure and haul the said types of materials therewith. The advantages of a tarpaulin device are the low cost of tarpaulin material, such as a sheet made of plastic coated fibers, strength, pliability, durability in out-of-doors use and collapsibility to facilitate storage in a small space when not in use. The following list of patents disclose inventions which fall into the category of hauling devices that lay flat on the ground to facilitate loading and that provide sides to secure the loaded material to facilitate hauling.

| PATENT NO. | PATENTEE | ISSUE DATE |
|---|---|---|
| 2,974,971 | Buck | 3/14/61 |
| 3,355,187 | Brindle | 11/28/67 |
| 4,173,351 | Hetland | 11/06/79 |

Buck's hauling device is comprised of a rectangular tarpaulin with three side panels and three straps attached to the main body. The straps extend beyond the hauling side and provide loops which hold a straight bar-like handle. A rope is threaded through hems provided along the three side panels. The rope ends extend from the hems on the handle side of the tarpaulin. When in use, the device is positioned flat on the ground with the side panels in a horizontal state. After material has been loaded, the operator pulls the rope ends to raise the side panels vertically to confine the material. The rope ends are provided with loops which are placed over the handle and the operator hauls the device by the handle. The disadvantage of this concept is that the operator may have difficulty raising the side panels which must be vertical to close up the gaps at the two rear corners. When pulling the rope ends, the device may not raise the side panels easily without vertical support and may tend to collapse. A further disadvantage is that the operator may have difficulty pulling the rope back through the hems to position the panels in a flat state after the device has been emptied. A further still disadvantage is that the Buck device would limit the bulk of material which may be confined due to the restrictive height reached by the side panels.

Brindle discloses a hauling device which comprises a tarpaulin with a hem along the rear edge. Enclosed within the rear hem are two rigid battens in tandem extending from the center of the tarpaulin to several inches beyond the side edges. The ends of a rope are threaded through hems along each side edge of the tarpaulin and secured to the extended batten ends. After material has been loaded, the operator folds the two batten ends together into a vertical position and ties them together, whereby a boat-like receptacle is provided at the rear of the device. The operator hauls the device by the rope at the opposite end. The primary disadvantage of this concept is the excessive friction point at the base of the battens when the device is hauled along the ground. With a heavy load in tow, the battens would tend to dig in and hang up over rough terrain, may cause damage to soft turf, and would quickly wear through the tarpaulin material over abrasive surfaces. Furthermore, this concept would make hauling a small load awkward wherein the vertical battens would fall forward without the support of a sizable bulk of material.

Hetland discloses a hauling device which comprises a sled-like vessel made of corrugated cardboard or such material with three fixed side panels and a fourth side panel which folds down to facilitate loading. A rope is secured around the fixed panels and loops beyond the folding panel. When material has been loaded, the operator lifts up and secures the folding panel and hauls the vessel by the loop of the rope. Although this concept can be produced at a low cost, one would question whether a device of cardboard construction could stand up in out-of-doors use, especially when used in wet conditons. the apparent disadvantage is that material at ground level may only be loaded easily onto the device from the folding side, whereas loading material from the other sides would require the operator to lift up the material over the side panels.

While the above listed patents provide a relatively inexpensive means of hauling material, each of the cited devices requires the operator to first secure the collected material by one means before the device may be hauled away by another means; which in turn, requires the operator to undo the securing means after the device has been emptied so that the device may be positioned in a flat state to facilitate loading more material.

SUMMARY OF THE INVENTION

A hauling device for leaves, litter, and other material is comprised of a rectangular tarpaulin with flexible rods secured in a hem along the rear and a portion of each side edges. A rope is assembled in a unique manner, whereby the operator pulls the rope and that action both secures the loaded material, by harnessing the rear and side edges, and provides a means to haul the device for the purpose of transporting said loaded material to another location.

Among the objects of the present invention are: to provide an improved, low-cost, durable hauling device; to provide a device which will lay in a flat state on the ground to facilitate loading material and which provides sides for securing the loaded material to facilitate hauling the device to a disposal area; to provide a device which allows the operator to secure and haul loaded material by simply pulling a rope; to provide a device which may be positioned easily in a flat state by the operator after the device has been emptied of loaded material; to provide a device which may be folded into a compact state to both facilitate storage when the device is not in use and the distribution and sale of the device; and to provide a hauling device which may lend itself to variations in size and weight; for example, a small, lightweight constructed device which may be used to haul leaves and litter by hand, to a large, heavyweight constructed device which may be used to haul manure and tree stumps by a tractor.

Related objects and advantages of the present invention will be apparent from the following description.

DESCRIPTION OF THE PREFERRED EMBODIMENT

Figure 1:
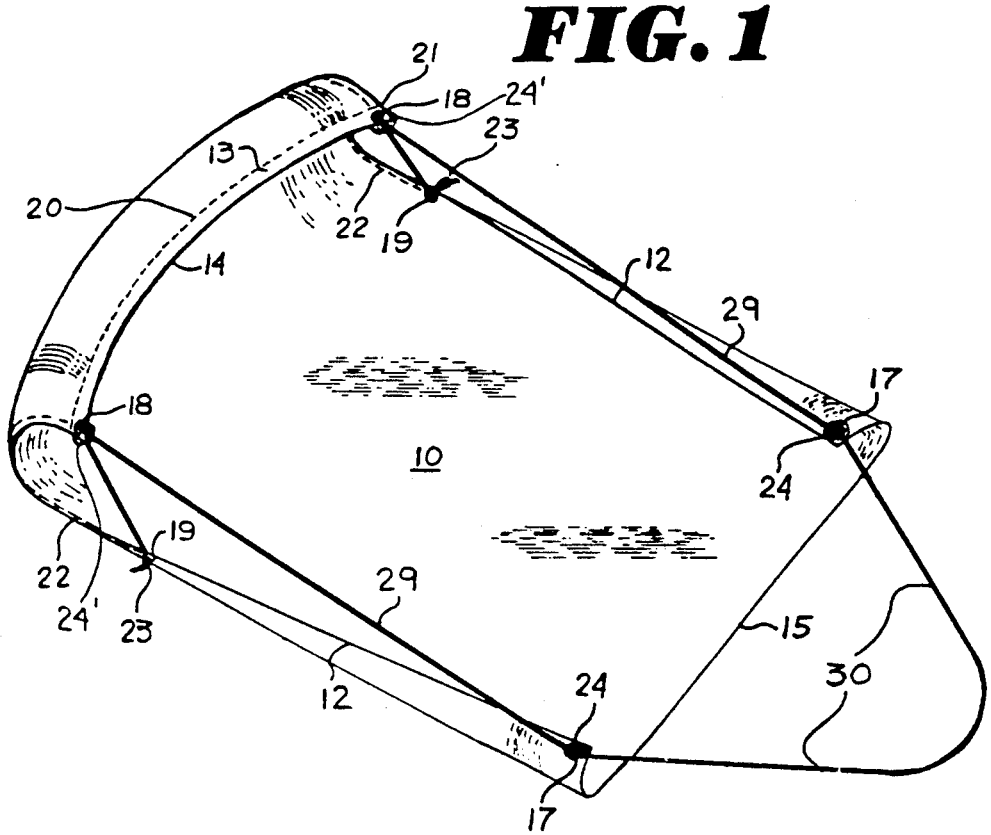
FIG. 1 is a perspective view of this invention in a position as it would be hauled across the ground.
Figure 2:
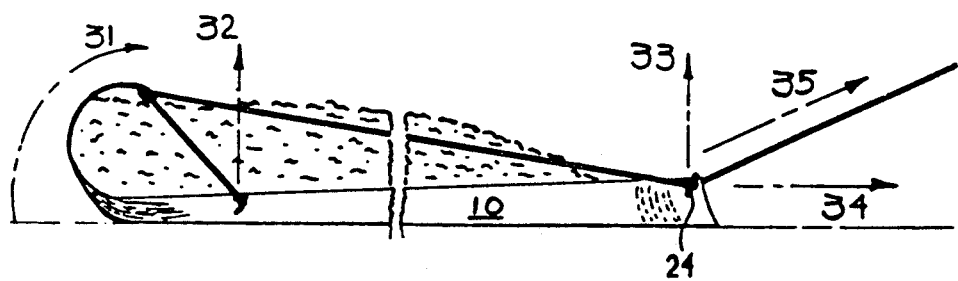
FIG. 2 is a left side elevation view of the FIG. 1 device containing collected material being hauled over the ground.
Figure 3:
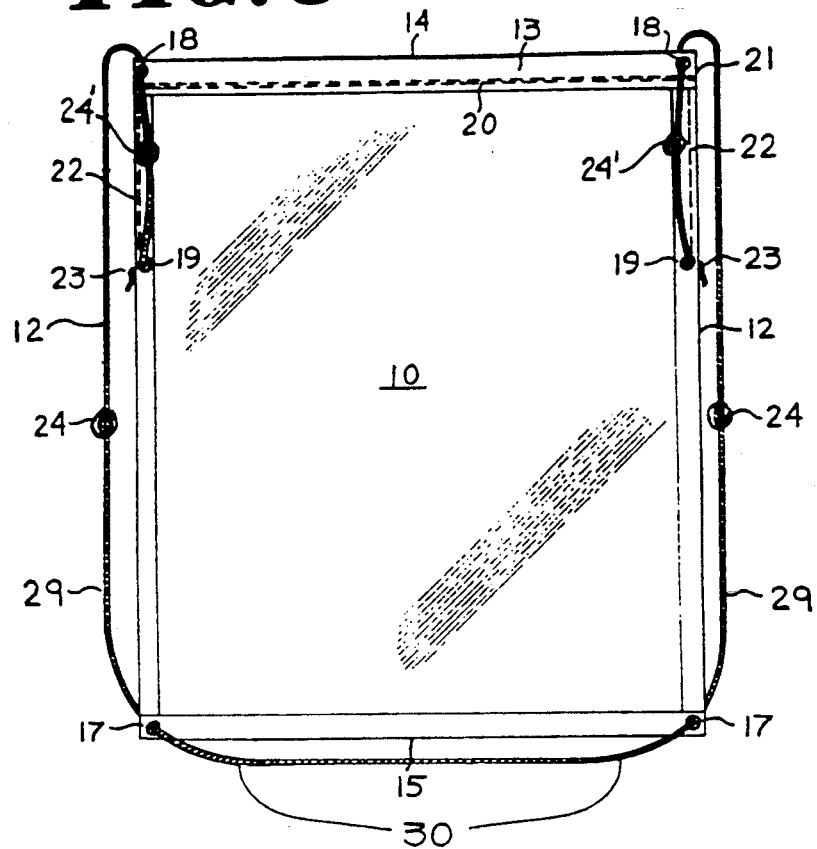
FIG. 3 is a top plan view of this invention in a position to load material thereon.

As shown in the drawings, and particularly in FIGS. 1, 2 and 3 thereof, the hauling device of this invention includes a generally rectangular sheet 10, of flexible material suitable for the purpose having front, rear and side edges 15, 14 and 12, respectively. Many diverse types of material may be suitable for use in the sheet 10, particularly those materials generally used in tarpaulins including relatively lightweight, flexible resinous materials and a heavyweight cotton duck.

Referring to FIG. 3 of the drawings, the sheet 10 is fixed with hardware 17 and 18 which provides apertures through which a flexible rope 29 is threaded. This hardware permits the rope 29 to move freely, such as would be provided by grommets or the like as illustrated in FIGS. 1, 3, 4 and 5 of the drawings. The hardware 17 and 18 is attached to sheet 10 at each corner and preferably located close to the edges 12, 14 and 15, inasmuch as a secure attachment is provided. Additional hardware 19 is fixed to the sheet 10 to provide an attachment to secure the ends of the rope 29 thereto. The hardware 19 is located along the edges of the sides 12 at a preferred point to be generally determined from the rear edge 14 forward to approximately one-third the distance to the front edge 15, however, varying this preferred point fore and aft may be advantageous for diverse hauling tasks.

Figure 4:
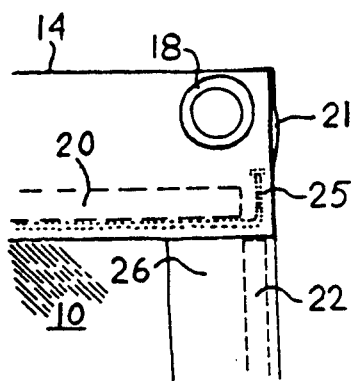
FIG. 4 is a fragmentary perspective view of the right rear corner of the device.
Figure 5:
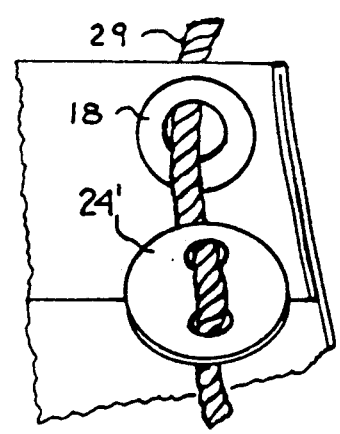
FIG. 5 is a fragmentary perspective view of the FIG. 3 device with a "stop" on the rope and a corner grommet in the tarpaulin.

An elongated pocket or sleeve 13 is provided along the rear edge 14 of the sheet 10, such as would be formed by stitching or by otherwise effecting a hem with one end closed. The pocket opening 21 as illustrated in FIG. 4 of the drawings provides an entrance into the pocket 13 to receive the flexible support member 20, which will be described in detail below. The support member 20 is inserted into the pocket 13 and secured therein by any means to partially close the pocket opening 21, such as illustrated by the stitching 25 in FIG. 4 of the drawings wherein the support member 20 is seated behind the stitching 25. The flexible support member 20 extends the full length of the pocket 13. It will be noted that provision is anticipated to assemble sections of the support member 20 with connectors for the purpose of facilitating the marketing thereof. A pair of flexible support members 22 are sealed within a hem or otherwise attached along the side edges 12 of the sheet 10 with each support member extending from the hardware 19 to a point adjacent to the pocket 13 as illustrated in FIG. 4 of the drawings.

The flexible support members 20 and 22 are generally rods composed of a resinous material or the like with certain preferred characteristics: a stiffness adequate to support the sheet 10 along the rear edge 14 and along the side edges 12 wherein said edges are lifted up by the corner hardware 18, a flexibility and recoil suitable for the purpose described in the operation below, and a tensile strength adequate to withstand the due pressure exerted by loaded material being hauled upon the sheet 10 wherein the weight of the loaded material is a reasonable amount.

Referring to FIGS. 1, 2 and 3 of the drawings, a rope 29 is shown threaded through the apertures of the corner hardware 17 and 18 and secured to the side hardware 19. The rope 29 may be of any type cordage suitable for the purpose herewith such as polyethylene, polypropylene, sisal, hemp, cotton or wire strand and should provide a thickness which allows for free movement through the apertures of the corner hardware 17 and 18. The rope 29 may be assembled with the hardware 17, 18 and 19 in several fashions, however, the preferred assembly is illustrated in FIG. 3 of the drawings, wherein the ends are secured to the side hardware 19, which are shown as grommets, by being threaded through the hardware 19 with knots 23 tied at the ends. Therefrom, the rope 29 is threaded through the apertures of the hardware 17 and 18 providing a loop 30 along the front edge 15 which the operator may grasp to operate the device. It will be noted that the said preferred assembly of the rope 29 has the portions along the sides 12 threaded through the apertures of the hardware 17 and 18 from the bottom side up, thereby allowing the rope 29 to lay under the sheet 10 when positioned in a flat state on the ground.

Along the sides 12, the rope 29 is provided with obstructions 24 and 24' which are used to arrest the moving action of the rope 29 at the apertures of the hardware 17. Many diverse means may be used for obstruction 24, for example, knots tied into the rope 29. It is also preferred that obstructions 24 and 24' provide a means whereby they may be relocated fore or aft along the rope 29, such as provided by a fastener 24' shown in FIG. 5 of the drawings which may be loosened, relocated fore or aft along the sides 12, and tightened while the rope 29 remains assembled. The foregoing preferred assembly of the rope 29 will become apparent from the following description of the operation of the device.

In operation, the sheet 10 is positioned in a flat state on the ground as illustrated in FIG. 3 of the drawings. The portions of rope 29 on the sides 12 may be placed under the sheet 10 to provide a clear surface along the side edges 12 for materials to be easily raked or by another means placed onto the sheet 10. It will be noted that the support member 20 within the pocket hem 13 provides a weight and stiffness along the rear edge 14 which firmly holds said edge to the ground to facilitate the process of loading material; for example, raking or blowing leaves onto the sheet 10 thereat would not turn up the rear edge 14, thus providing means much like that of a dust pan.

Referring to FIG. 1 and particularly FIG. 2 of the drawings, once material has been loaded onto sheet 10 and reached a suitable size, the operator grasps the loop 30 and pulls away from the front side 15 as illustrated by the direction 34 in FIG. 2 of the drawings, thereby the rope 29 moves through the apertures of the hardware 17 and 18 drawing the corner hardware 18 toward the pulling direction 34, whereby the rear edge 14 is lifted into a vertical position as shown by the motion 31 in FIG. 2 of the drawings. The support members 22 provide a stiffening along the side edges 12 between the hardware 18 and the adjacent hardware 19 and thereby hold the support member 20 in a horizontal position off the ground providing a wall of the sheet 10 thereat to contain the loaded material. Also, the flexibility of the support members 20 and 22 allow the sheet 10 to wrap around the loaded material as illustrated in FIG. 2 of the drawings. When the recoiling force exerted by the support members 20 and 22 increases at hardware 18, the hardware 19 is lifted up and thereby provides sides to contain the loaded material thereat. While the operator continues to pull, the loop 30 is elongated thereby drawing hardware 17 toward the inner portion of the sheet 10 and, combined with the pulling angle 35, lifts up the corner hardware 17 to provide sides along the sheet 10 thereat. In unison, these said parts and forces secure the loaded material within the sheet 10 along the rear edge 14 and the side edges 12. Finally, when the obstructions 24 reach the apertures of the hardware 17 as shown in FIGS. 1 and 2 of the drawings, the rope 29 is secured thereat to provide a towline of the loop 30 to haul the device to another location. It will be noted that the provision described herewith for the adjustment of the obstructions 24' along the rope 29 is for the purpose of controlling the elevation of the rear side 14. It may be advantageous to relocate the obstructions 24 toward the front edge 15 to ease the pressure exerted on the corner hardware 18 wherein heavy materials are hauled with device such as stone, earth or the like.

Once the loaded material has been hauled to the place for disposal, the operator releases the loop 30 and grasps the sheet 10 by the rear edge 14 and rolls out the loaded material from the rear edge 14 over the front edge 15 to free the sheet 10 from the contents. The support members 22 are easily recoiled by the operator giving the sheet 10 a shake which retracts the rope 29 through the apertures of the hardware 17 and 18 which provides the sheet 10 in a flat state suitable to position on the ground for another load of material. Provision is contemplated for a hitching means to be secured to the body of the sheet 10 extending from the rear edge 14 to facilitate the unloading of heavy material, wherein a tractor or such mechanical device may hitch thereto and roll out the heavy material.

Although the present invention has been shown in connection with a certain embodiment, it will be readily apparent to those skilled in the art that many variations and modifications may be made to suit the purpose without departing from the spirit of the invention, and it is to be distinctly understood that the foregoing is descriptive of the preferred embodiment only and that the scope of this invention is to be determined by reference to the appended claims.

The invention claimed is:

1. A device for hauling leaves, litter, and other materials, comprising:

a generally rectangular sheet of flexible material having front, rear, and side edges;

a plurality of flexible support members, one of said support members being secured along said rear edge of said sheet and other of said support members being separately secured along a portion of each of said side edges extending from said rear edge forward to a point between the front and rear edges;

aperture means for defining an opening in each corner of said sheet; and flexible rope means having ends threaded through said aperture means in both corners of a respective side edge from said front edge to said rear edge and secured to a respective side edge approximately at said point and said rope means having stop means for engagement with said aperture means for controlling the extent of movement of said rope means through said aperture means;

whereby pulling said rope means away from said front side causes said rope means to slide through said aperture means and said sheet to curve about a generally widthwise axis to gather around the material collected therein.

2. The device recited in claim 1 including a hem along said rear edge to provide an elongated pocket to effect means to secure said flexible support member therewith and permit the removal of same.

3. The device recited in claim 1 wherein said flexible rope means in a single piece has the ends secured to said sheet at said preferred points and therefrom is threaded through said aperture means wherein the portions of said rope means along said side edges are under said sheet.

4. The device recited in claim 3 wherein a pair of said stop means are each secured to said rope means along the portions of each said side edge of said sheet whereby said stop means arrest the moving action of said rope at said aperture means at the front edge corners of said sheet thereby to form a towline of the portion of said rope means along said front edge.

5. The device recited in claim 4 wherein said stop means are movable along said rope for the purpose of controlling the elevation reached by said sheet along said rear edge during said gathering operation of said sheet.

* * * * *